June 6, 1950 H. F. SOLOMON 2,510,527
PORTABLE REFRIGERATING UNIT
Filed Aug. 7, 1947 3 Sheets-Sheet 1

INVENTOR.
Harry F. Solomon,
BY Victor J. Evans & Co.
ATTORNEYS

June 6, 1950     H. F. SOLOMON     2,510,527
PORTABLE REFRIGERATING UNIT

Filed Aug. 7, 1947     3 Sheets-Sheet 3

INVENTOR.
Harry F. Solomon,
BY Victor J. Evans & Co.
ATTORNEYS

Patented June 6, 1950

2,510,527

UNITED STATES PATENT OFFICE 2,510,527

PORTABLE REFRIGERATING UNIT

Harry F. Solomon, Macon, Ga.

Application August 7, 1947, Serial No. 766,933

1 Claim. (Cl. 62—4)

This invention relates to freezer units and more particularly to a unit adapted to be placed in an automobile trunk compartment, trailer or used on camp sites where there is no electricity available for the operation of the refrigerating unit.

It is an object of the present invention to provide a unitary refrigerating plant and freezer box which will be operable by a gas engine and wherein when the refrigerating temperature is reached the gas engine will be automatically shut off by a thermostat having a switch in the ignition circuit of the engine.

Other objects of the present invention are to provide a refrigerating unit particularly adapted for transport and for camps and other places wherein no electric current is available, which is of simple construction, easy to transport, inexpensive to manufacture and efficient in operation.

For other objects and for a better understanding of the invention, reference may be had to the following detailed description taken in connection with the accompanying drawing, in which Fig. 1 is a longitudinal cross-sectional view of my refrigerating unit.

Fig. 5 is a diagrammatic view of the thermal control switch and of the wiring circuit extending between the ignition plug of the engine and the ground.

Figure 1:
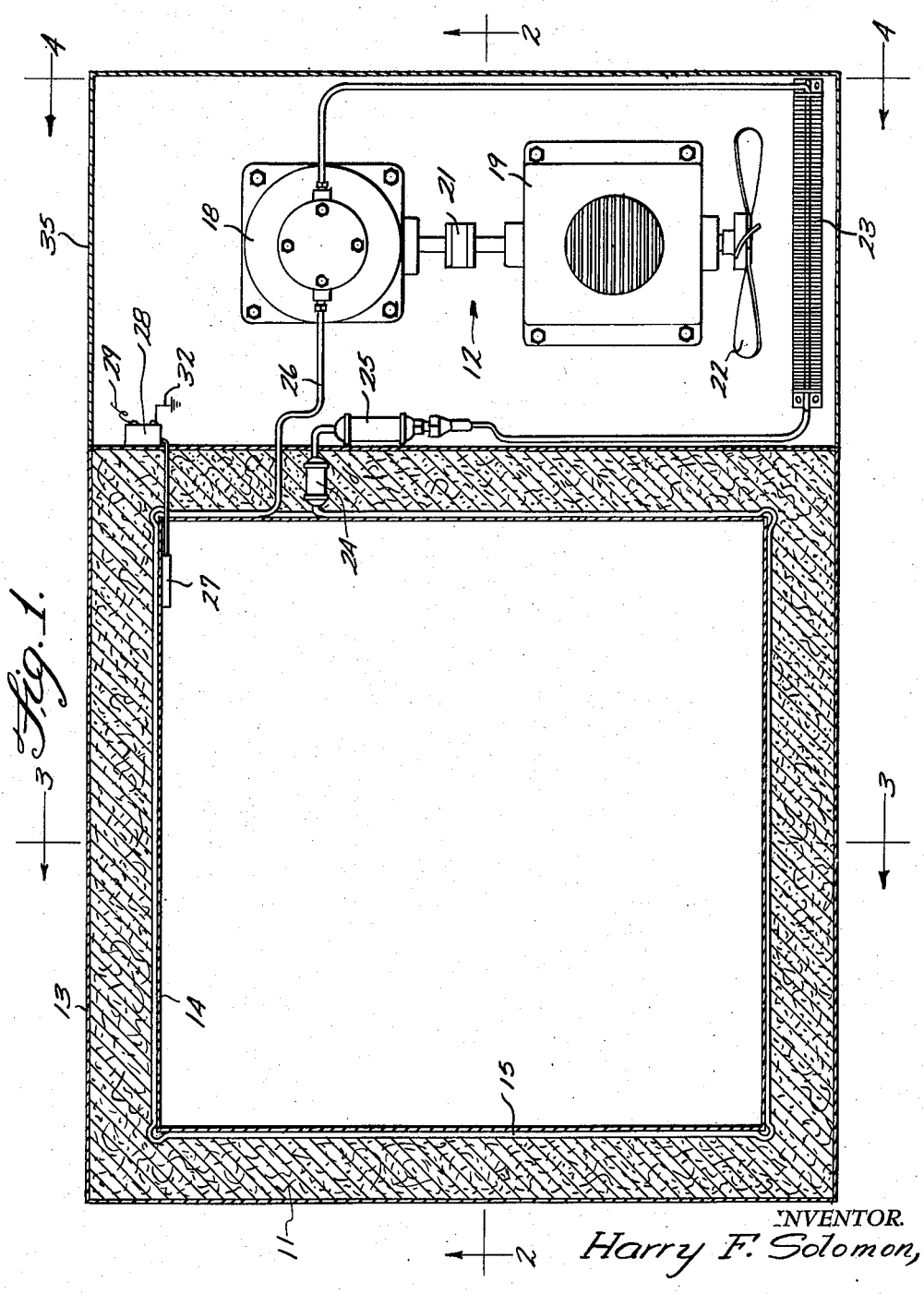
Figure 2:
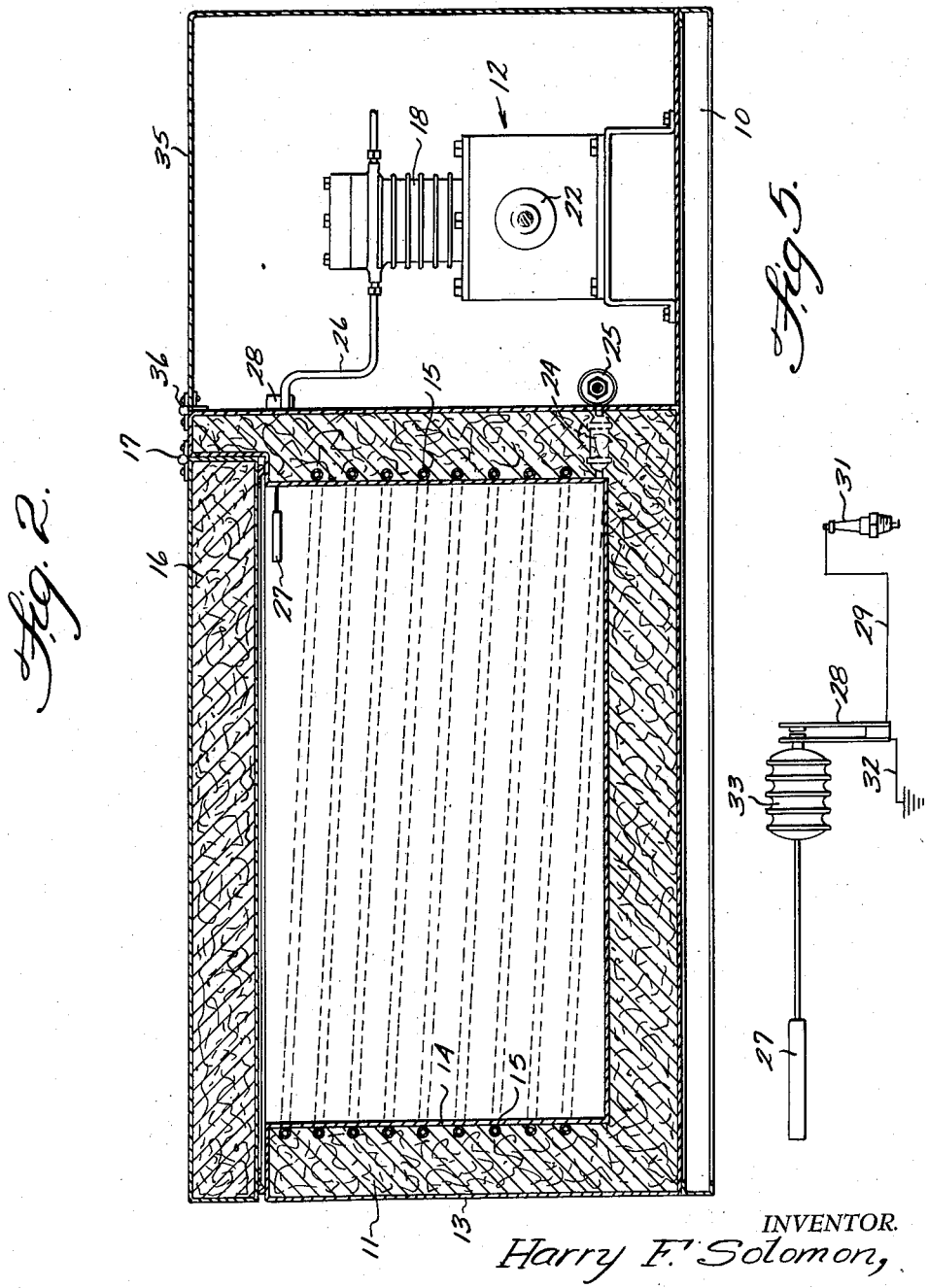
Fig. 2 is a longitudinal cross-sectional view taken on line 2—2 of Fig. 1.
Figure 3:
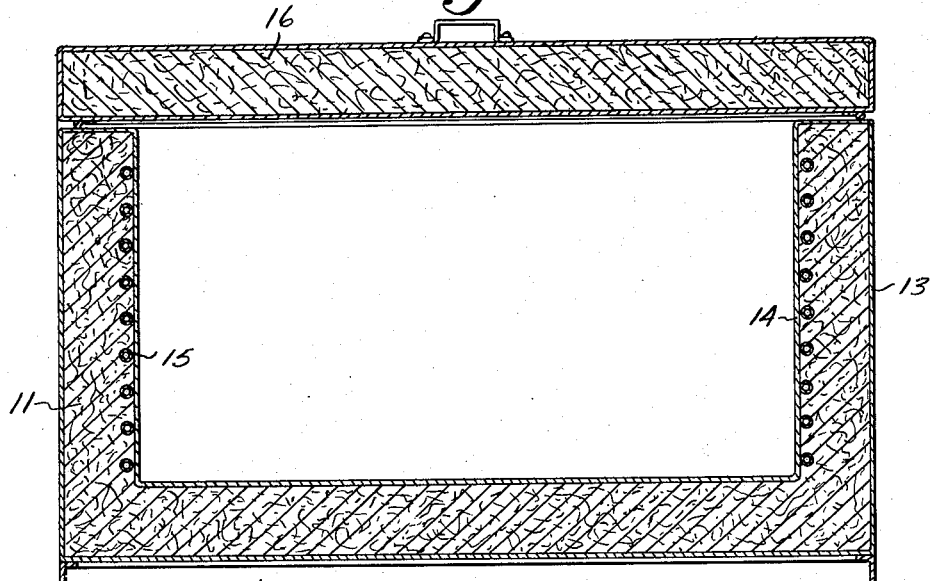
Fig. 3 is a transverse cross-sectional view taken through the refrigerating compartment and on line 3—3 of Fig. 1.
Figure 4:
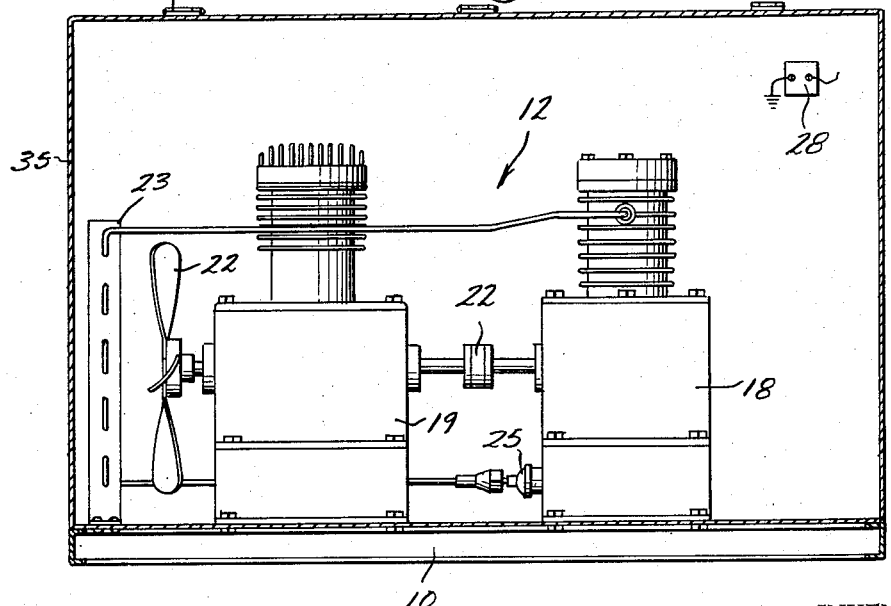
Fig. 4 is a transverse cross-sectional view taken through the refrigerating equipment compartment and looking upon the compressor and gasoline engine for operating the same.

Referring now to the figures, 10 represents a supporting frame on which is mounted a cooling compartment 11 and refrigerating equipment indicated generally at 12. The cooling compartment comprises heavy insulated walls having a metal exterior 13 and a metal interior 14. In the interior, there may be disposed any of the foods or liquids to be kept cool. Behind the interior wall 14 is a coil of pipe 15 through which a refrigerating medium, such as freon or other suitable refrigerating gas, is extended. At the top of the compartment is a heavy insulated cover 16 which is raised to gain access to the compartment 11. The cover is hinged to one end of the compartment as indicated at 17.

The refrigerating equipment includes a compressor 18 and a gas engine 19 connected to the compressor through a flange coupling 21. The gas engine 19 has a fan 22 to blow air across a condenser 23. The engine 19 is started manually. The refrigerating medium will be passed to the coil 15 through a thermal expansion valve after first passing through a dehydrator and strainer unit 25. The dissipated medium will return through pipe 26 to compressor 18.

Extending into the compartment 11 is a thermal element 27 connected to a thermal control switch 28 which has a wire 29 adapted to extend to ignition plug 31 of gas engine 19, and which has a ground connection 32. A bellows 33 is operated by the fluid extended from the thermal element 27. As the bellows 33 is expanded, switch 28 will be closed. As the refrigerating compartment is cooled to a predetermined temperature, the engine 19 will be stopped by breaking the ignition circuit thereof.

Over the refrigerating equipment 12 there is extended a hood 35 which is hinged to the top of the refrigerating compartment 11 as indicated at 36. This hood can be raised toward the cover 16. The arrangement is such that both the hood 35 and the cover 16 can be raised simultaneously or one left down while the other is raised. It may be advantageous during the hot weather to keep the hood 35 in a raised position.

Having thus set forth and described the nature of my invention, what is claimed is:

A portable refrigerating unit comprising a frame, a refrigerating compartment connected to the frame, refrigerating equipment connected to the frame adjacent to the compartment and connected to the same to extend refrigerating medium thereto, a cover at the top of the refrigerating compartment, and a hood hinged to a wall of the compartment and adapted to extend over the refrigerating equipment on said frame, whereby to provide a refrigerating unit which is compact with all the parts mounted on a single frame, and said refrigerating equipment comprising a compressor secured to the frame, a gas engine coupled to the compressor to drive the same, a fan driven by the engine, a condenser disposed on the frame adjacent the fan of the engine whereby air will be extended over the same, and said gas engine including an ignition plug, a switch connected to the ignition plug and to the ground for the engine, a thermal element extending into the cooling compartment and connected to the switch for the operation of the switch when the temperature within the refrigerating compartment has been lowered to a predetermined extent, and the operation of the switch causing the grounding of the ignition current to stop the engine.

HARRY F. SOLOMON.

REFERENCES CITED

The following references are of record in the file of this patent:

UNITED STATES PATENTS

| Number | Name | Date |
| --- | --- | --- |
| 1,932,696 | Heydthausen | Oct. 31, 1933 |
| 1,943,964 | Hulse | Jan. 16, 1934 |
| 2,053,206 | Sargent | Sept. 1, 1936 |